United States Patent [19]

Bily

[11] 4,432,999
[45] Feb. 21, 1984

[54] WHEY-SOYBEAN PRODUCT AND PROCESS FOR MAKING THE PRODUCT

[76] Inventor: Robert R. Bily, P.O. Box 3637, San Jose, Calif. 95156

[21] Appl. No.: 429,063

[22] Filed: Sep. 30, 1982

Related U.S. Application Data

[63] Continuation-in-part of Ser. No. 300,699, Sep. 10, 1981, abandoned.

[51] Int. Cl.³ .................... A23C 21/06; A23C 21/08; A23L 1/20
[52] U.S. Cl. .................................. 426/583; 426/634
[58] Field of Search ............... 426/580, 583, 582, 634, 426/633

[56] References Cited

U.S. PATENT DOCUMENTS

| | | | |
|---|---|---|---|
| 2,173,922 | 9/1939 | Supplee | 426/583 |
| 2,536,438 | 1/1951 | Grelck | 426/583 |
| 2,555,514 | 6/1951 | Sharp et al. | 426/583 |
| 3,531,294 | 9/1970 | Glabau | 426/534 X |
| 3,669,678 | 6/1972 | Kraft | 426/583 X |
| 3,798,339 | 3/1974 | Peng | 426/583 X |
| 3,911,142 | 10/1975 | Huelskamp | 426/656 X |
| 3,943,264 | 3/1976 | Davis | 426/583 X |
| 3,966,992 | 6/1976 | Banks et al. | 426/583 |
| 4,105,803 | 8/1978 | Peng | 426/583 |

OTHER PUBLICATIONS

Hunter; B. T., "The Natural Foods Cookbook", Jove Publ. Inc., N.Y. 1961, pp. 188, 189.
Brooks; K., "The Forget-About-Meat Cookbook", Rodale Press Inc., Emmaus, Pa., 1974, pp. 126, 127, 132, 133.

Primary Examiner—Robert A. Yoncoskie

[57] ABSTRACT

A food product is provided which incorporates a relatively large quantity of whey solids in a form in which they are quite palatable to humans. The whey solids are dispersed in a specially prepared soy pulp. The soybeans are cooked and then comminuted into a soy paste to release the soybean constituents for reaction with the whey solids to form a paste without evidence of free water of the intermixed and interreacted constituents of the soy paste and the whey.

10 Claims, No Drawings

WHEY-SOYBEAN PRODUCT AND PROCESS FOR MAKING THE PRODUCT

This application is a continuation-in-part of application Ser. No. 300,699 filed Sept. 10, 1981, now abandoned.

SUMMARY OF THE INVENTION

An authoritative background for the present invention is set forth in the introduction to the publication WHEY PROCESSING AND UTILIZATION by M. T. Gillies (Noyes Data Corporation, Park Ridge, N.J., 1974):

"Whey is the serum or watery part of milk that separates from the curds in the process of making cheese. It is the largest by-product of the huge U.S. dairy industry, and is one of the most troublesome by-products produced by any industry. It is now having considerable impact on economic and environmental affairs.

Ecologists are concerned about the heavy burden whey makes on our sewage systems and streams; humanitarians, feeling that whey's valuable nutriments should offer help in feeding the world's hungry, are horrified at the fact that only half of the nation's whey is currently being utilized; and consumers, viewing with dismay the rising prices of cheese note with anger that the increasing costs of whey disposal contribute to these higher prices.

Approximately ten pounds of milk are used to produce a pound of cheese, and from six to nine pounds of whey result. The whey contains from 6 to 7% solids—about half those in milk.

If whey is unused, its organic nutrients make it a costly pollutant in the nation's sewage systems and waterways. Biological oxygen demand (BOD) values for cottage cheese wheys range from 30,000 to 45,000 milligrams per liter. A load of 1,000 gallons of raw whey discharged into a sewage treatment plant has been calculated to equal the load imposed by 1,800 people. Because BOD removal is usually not completed in the sewage treatment plants, this hugely oxygen-demanding effluent is partially passed into rivers and streams. Every 1,000 gallons of raw whey discharged into a stream would require the dissolved oxygen in over 4,500,000 gallons of unpolluted water for its oxidation.

It is clear, therefore, that it is imperative that practical methods for turning whey from a liability as an effluent to an asset as a food supplement for men and animals be developed."

It is a common practice to dispose of whey by discharging it into a sewage system and studies reveal that as much as half of the raw whey produced by this country's large and growing cheese industries is so wasted. Whey that is presently used in commerce is usually dehydrated into whey solids which are then sold in dry form. Every pound of dry whey solids utilized removes approximately sixteen pounds of liquid whey from the environment. Of that portion of the whey that has been utilized heretofore for human consumption, only relatively small quantities of whey solids are employed in most products. This amount seldom exceeds 4% by weight of the final food. This is because whey which is derived from fermentation, e.g., cheese making, contains a host of compounds which contribute to the disagreeable odor and flavor characteristic of whey. Representative of the compounds are ethyl alcohol, lactic acid, acetaldehyde, ethyl acetate, phenol, cresols, terpenes, isoprenoids, diacetyl and short chain fatty acids along with various nitrogen and sulfur compounds. A primary use is in dessert style products where it is necessary to employ large quantities of sweeteners to mask the off-flavor of the whey solids. Other methods include incorporating relatively large quantities of fat to mask the gritty character of the whey solids. This is often done in conjunction with sweeteners. In some instances, whey solids are included with other ingredients to form a powdered milk replacer which is then included in baked goods and other foods; however, the portion of whey solids in the finished food product usually does not exceed 1.5% by weight of the product. Higher amounts are added to various low-moisture snack foods which are usually flavored, sweetened or salted and which are generally expensive and are not used as staples in the American diet due to their low-moisture content and sweet or salty nature. Since whey solids are over 70% lactose, foods utilizing whey solids in large quantities as ingredients therein must be very low in moisture or their other ingredients must be able to absorb and bind the humectant properties of the lactose which are activated by the addition of moisture. Whey solids and the lactose therein have the ability to combine with water into a syrup-like emulsion that maintains moisture and creates a tenderizing effect in the final product. This water and high whey solids emulsion must be bound by the other ingredients in the food system or separation of the water-whey solids phase from the other ingredients will occur, resulting in syrup-like and/or gritty consistencies in the final food product. This separation manifests itself in lower moisture food systems as crystalization and in higher moisture food systems as "wheying-off". Low moisture foods contain up to 19% moisture while very low moisture foods contain an average of 2 to 4% moisture. Semi-moist foods generally contain 20 to 35% moisture, and moist foods contain more than 35% moisture. These percentages are approximations to help describe the food product herein. Food staples in the American diet are known to be moist in nature.

In accordance with this invention, a foodstuff is created which is moist and quite palatable as such for human consumption. It contains a large quantity of whey solids without any added fat, salt or sweetener. The product possesses excellent palatability and has a very high nutritional value.

Accordingly, it is the broad object of the invention to provide a product which, while utilizing a relatively large portion of whey solids, has excellent flavor, body, texture and an exceedingly high food value at low cost so it can be eaten as a staple food by a large number of people.

Therefore, the whey solids must be incorporated in a carrier that must be highly nutritious, low in cost, and is widely available in good quantities and recognized by consumers as a wholesome food staple. Furthermore, said carrier must be able to absorb and bind the humectant properties of the whey solids and mask their off-flavors. The presence of all these advantages are essential to secure the wide marketability of the food product and the whey solids therein.

To practice the invention, I incorporate the whey solids in a carrier which masks the off-flavor of the whey solids and their gritty character and fulfills the criteria set forth beforehand. Such a carrier I have found is provided by a homogeneous paste made from soybeans and water. The whey solids and the carrier must be incorporated and made one by a procedure that involves more than a mere mixing of the ingredients providing the finished product. The details of the procedure to be employed are included herein under the title—FORMULATION OF THE DESIRED END PRODUCT.

It is important that the dry whole soybeans be freshly cooked for the first time immediately prior to use. Previously cooked and dehydrated soybeans or soybean materials cannot be used as the carrier for whey solids. The interaction of any previously processed soybean materials with whey solids does not produce a final product with the qualities gained from using freshly cooked soybeans. The product so produced has a bitter off-taste that will unfavorably affect the average palate. The beans should not be overcooked to a soft texture because their protein is denatured by the overcooking. Firmly textured soybeans provide the food product with a better body and texture by binding the humectant properties of the whey solids to a greater degree. Water should be added to the finely ground cooked soybean to prepare a soybean paste. The quantity of the water should not exceed 120% of the initial weight of the cooked soybeans because beyond 120% the soybean constituents necessary for co-action with the whey solids are diluted to a level of poor effectiveness. The cooking water from the cooked soybeans is preferable to fresh tap water for addition to the soybeans to create the soy-paste because of enhanced flavor, but both are acceptable.

The use of soybeans to provide the solid portion of the whey solids carrier is unexpectedly unique in comparison with the other members of the legume family or the cereal family. Cohesiveness and homogeneity of the carrier are essential, and the body and texture of the carrier must be able to absorb and bind the humectant properties of the whey solids when mixed therein without losing its cohesive and homogeneous properties. The cooked soybeans contain certain quantities of oil, lecithin and protein not found in other legumes, cereals or other vegetable foods and which are necessary to the perfecting of a cooperative relationship with the whey solids. These quantities of oil, lecithin and protein in the soybeans contribute significant functional qualities to the final soy-paste and whey solids food system when soybeans are processed according to the methods described hereinafter. These functional qualities are not available from other inexpensive food staples. Dry whole soybeans are over 40% protein. The high protein content of the soybeans binds the water and the whey solids into a stable, cohesive, homogeneous, smooth mixture which does not whey-off. The emulsification properties of the soybean's protein contribute form and stabilization to the final food system while promoting oil absorption and water uptake and retention. The high protein content also creates excellent body, texture and cohesion in the final product. Simultaneously, the oil content of the soybean adds a rich creaminess to the body, texture and flavor of the soy-paste-whey solids food product while coating the whey solids and helping to prevent grittiness.

The quantity of oil averages 20% by weight of the dry soybean. This is high, but there is also a high level of lecithin in the dry soybean to emulsify the oil. The amount of lecithin averages 2.5% by weight of the soybean, and the ratio of oil to lecithin is approximately 8 to 1. This high lecithin to oil ratio allows for excellent emulsification and dispersion of the oil in the water phase of the food system and promotes the stabilization of oil, protein and water into a homogeneous unit. Furthermore, the lecithin aids in the binding, mixing and dispersion of the lactose and other whey solids with the oil, protein and water of the soy-paste-whey solids product. This factor helps to prevent grittiness or wheying-off in the final food product, thus improving body and texture. Flavor is also improved because the off-flavors of the whey solids are dispersed evenly throughout the homogeneous mass by the oil and lecithin of the soybean which are known to be flavor carriers.

The humectant properties of the lactose in the whey solids are activated by the water phase of the soy-paste carrier. This would normally tend to create syrup-like consistencies that separate from the other ingredients when using large quantities of whey solids in a moist food system. However, the large amounts of oil, lecithin and protein in the soybean are sufficient to emulsify, bind and stabilize the whey solids and the high concentration of lactose therein so separation does not occur. This allows the lactose to be held in homogeneous suspension to provide a smooth, palatable body and texture in the final food product. All these factors protect against stickiness, grittiness, lumpiness, mushiness and separation or wheying-off while providing a final product with excellent palatability, good mouthfeel and flavor. This further enables the product to be easily mixed with other foods. Shelf-life is also improved due to the anti-oxidant properties of the high lecithin and tocopherol content of the soybean.

The co-action of the water, protein, oil and lecithin in the soy-paste carrier with the humectant qualities of the lactose in the whey solids serves to keep the whey solids in a stable, homogeneous suspension within the soy paste. This fact allows for such an equal and permanent distribution of the off-flavors and grittiness of the whey solids that their negative effects on overall flavor, body and texture of the finished food product are nullified and a new product is created which is unlike any of the individual components in either appearance, texture or particularly in flavor.

Except for the soybean, all other legumes, all cereals as well as all other vegetable foods are too high in carbohydrates and too low in oil, lecithin and protein to provide the cooperative relationship needed to allow the successful admixture of large quantities of whey solids. Thus, by comparison, all other dry legumes except peanuts that are used as staples for human consumption contain on the average approximately 22% protein, 1.5% oil and trace amounts of lecithin as evidenced by their very low oil content. All dry cereal grains that are used as staples for human consumption contain on the average approximately 10% protein, 2% oil and trace amounts of lecithin as evidenced by their very low oil content. These food staples lack sufficient protein, oil and lecithin to become suitable carriers for large quantities of whey solids in a moist food system. These foods create bodies and textures that are either two gritty, sticky or mushy and all are subject to moisture separation when mixed with whey solids and water. This moisture separation occurs in these other foods creating problems categorized by part of the mixture becoming thin and syrup-like and part of the mixture becoming lumpy and rubbery. These foods cannot bind and stabilize the humectant properties of the whey solids which enhance wheying-off and grittiness in these foods because they lack the quantities of protein, oil and lecithin in proper proportions like the soybean does as shown herein. This fact leads to off-flavors and unappetizing bodies and textures in these foods when admixed with water and whey solids thereby producing unpalatable food products.

Peanuts are different from other legumes in that they contain approximately 25% protein, 47% oil and 0.4% lecithin on the average. However, their oil content is too high and their lecithin and protein contents are too low in proportion to their oil content to bind water, oil and whey solids effectively into a stable, cohesive mixture with excellent body and texture. The high oil content of the peanuts gives the mixture a pudding-like consistency similar to sour cream. Furthermore, the peanut flavor of the mixture is very strong compared to the bland flavors of most other legumes and cereal grains, and the heaviness of the high oil content is apparent both in mouthfeel and digestion.

The cooked soybean, when ground and mixed with water to form a paste-like carrier, is the only food able to bind, disperse, stabilize and absorb the humectant properties, acrid taste and grittiness of the whey solids when mixed therein. Rather than creating detrimental effects, these qualities of the whey solids actually provide beneficial effects to the soy-paste-whey solids mixture, developing smoothness of texture while creating flavors that are quite pleasing and, therefore, different from those of the separate components.

The new product possesses characteristics of utility that are new, additional and materially different from the property or properties which the several ingredients, the soybeans, the water and the whey solids individually do not possess. The selected combined ingredients produce a new, unexpected and useful function; namely, a palatable product containing a goodly proportion of whey solids.

DESCRIPTION OF THE BEST MODE OF PRACTISING THE INVENTION

The soybeans are processed in the following manner. The soybeans are first rinsed and then soaked in water for thirty to forty minutes after which they are removed and placed in a pressure cooker with water. Preferably the soybeans are not dehulled because the hulls are a good source of dietary fiber.

After being held in the pressure cooker at a temperature between 220° to 230° F. for a period of approximately thirty minutes, the beans are firm to the touch and require some pressure before they can be crushed between the fingers. Any other method of moisture cooking the soybeans to a firm body is acceptable such as boiling, cooking in hot water or steaming. After cooking, the beans are removed from the water which is saved for later addition. After cooking, the soybeans are ground to a fine particle size in a suitable food processor with sufficient water to form the ground beans into a paste. More water may be required to allow the addition of the higher quantities of whey solids and one can use as much as 120% of water on the weight of the cooked soybeans if desired. Amounts of water in the range of 40–50% by weight of the cooked soybeans generally create the most preferable final product. Obviously, the beans can absorb varying amounts of water in their cooking and may need more or less water in the blending. This so-formed paste is referred to herein and hereinafter as soy-paste.

The Soy-Paste and Whey Mix

With the soy-paste at hand, it is in order to add the whey solids which can be of either the sweet or the acid type. The whey solids are added to the soy-paste in an amount varying from about 12% to about 63% by weight of the soy-paste increasing proportionately to increases in the water which in turn ranges between 35 and 120% water by weight of the cooked soybeans. In this range, off-flavors and grittiness are eliminated. As an overall formula, I have had good results with a product which comprised approximately 100 parts of cooked ground soybeans, 50 parts of water and 35 parts of whey solids. The product was quite palatable and was free of any off-flavor or grittiness when prepared as is hereinafter related.

Rather than adding dry whey solids and water to the cooked ground soybeans, liquid condensed whey can be used by adjusting the moisture and solids content of the condensate to equal the required ranges of water and whey solids necessary to create the food product described herein. For example, if 40% water is to be added to 800 gms. of cooked ground soybeans and if 20% whey solids are to be added to the resultant soy-paste (ground soybeans and water), the total weight of the water and whey powder would equal 40% of 800 gms.+20% of 1120 gms. or 544 gms. Therefore, if 544 gms. of condensed liquid whey containing approximately 41.2% whey solids were added to the cooked ground soybeans, the critical ranges would be maintained. This procedure can be used regardless of what percentages of water and whey solids are added to the cooked, ground soybeans provided the percentages fall within the critical ranges described.

Other Ingredients Which Can Be Used

The body and texture of the soy-paste-whey solids mixture can be enhanced by the addition of small quantities of two other ingredients, soy protein isolate and non-fat dry milk. These two ingredients cannot be used in the food product as replacements for the freshly cooked soybean materials and whey solids, but due to their synergistic qualities with the soy-paste-whey solids mixture brought about by their overlapping and complementary functional properties, they can be used to advantage as additions.

Both soy protein isolate, which is a bland, almost pure protein derived from soybeans, and non-fat dry milk can be added independently of one another; one can be used in place of the other to achieve good results or they can be used together. When soy protein isolate is used alone to enhance body and texture, it can be added in the range of 3% to 18% by weight of the soy-paste (soybeans+water). Its amount is increased as the amounts of water and whey solids are increased throughout the critical ranges.

When non-fat dry milk is used alone, it can be added in the range of 5% to 33% by weight of the soy-paste, increasing proportionately to increases in water and whey solids to the ground soybeans. However, I have found that the addition of both soy protein isolate and non-fat dry milk creates the best body and texture and enhances the quality of the overall product to the greatest degree.

I have found that the soy protein isolate can aid in the emulsification, the binding of oil and water, the stabilization and the cohesion of the food product described herein very effectively without the presence of non-fat dry milk; but when used alone, said isolate diminishes the humectant properties of the whey solids upon the soy-paste-whey solids food product. This fact detracts from the smoothness and moistness of the food product. If non-fat dry milk is used alone without soy protein isolate, it does not aid in the functions described above as well as does the soy protein isolate. This is because the isolate is approximately 92% protein and non-fat dry milk is only 36% protein on the average, while containing approximately 51% lactose. As taught, it is the protein that performs said functions described above. Therefore, more non-fat dry milk must be used. This fact adds more lactose to the soy-paste-whey solids food system which creates a softer body and texture in the final product. When both the soy protein isolate and skim milk powder are added to the soy-paste-whey solids mixture, the mixture maintains its perfect character and balance as described herein. The protein fraction of the non-fat dry milk aids the soy protein isolate in aiding the emulsification, the binding of oil and water, the stabilization and the cohesion of the food product while the lactose content of the milk helps to maintain the necessary smoothness, palatability and moistness in the paste created by the whey solids. Furthermore, the protein, oil and lecithin from the freshly cooked, finely comminuted soybeans aid in the emulsification, dispersion, absorption and stabilization of the milk and isolate constituents.

It was found that the following amounts of non-fat dry milk and soy protein isolate enhanced the body and texture of the soy-paste-whey solids mixture in the best manner while maintaining the balance of flavor found in the food product. Soy protein isolate is added in amounts ranging from 2% to 10% and non-fat dry milk is added in amounts ranging from 3% to 17%, both by weight of the soy-paste (soybeans and water). Their amounts increase proportionately to increases in water and whey solids in the soy-paste. As shown, the finished product's quality is maintained because the soy-paste-whey solids mixture and the soy protein isolate-non-fat dry milk combination are both soy-dairy combinations, thus maintaining the quality and synergy of the final product due to their overlapping functional and chemical properties.

As an overall formula, I have had good results with a product which comprised approximately 100 parts of cooked ground soybeans, 50 parts of water, 35 parts of whey powder, 5 parts soy protein isolate and 7 parts non-fat dry milk. It is possible to substitute soy protein concentrate which is approximately 70% protein for the soy protein isolate provided it is bland in flavor and added in the equivalent amount as the isolate.

EXAMPLE I

The following table recites the ingredients and percentages thereof which have been employed in the process:

TABLE I

| Ingredient | Percentage | % | Weight |
|---|---|---|---|
| Cooked Ground Soybeans | | 56.2 | 300 gms |
| Water (to make soy-paste) | 40% by weight of the cooked soybeans | 22.5 | 120 gms |
| Whey Solids | 20% by weight of the soy-paste | 15.7 | 84 gms |
| Soy Protein Isolate | 3% by weight of the soy-paste | 2.4 | 12.6 gms |
| Non-Fat Dry Milk | 4% by weight of the soy-paste | 3.2 | 16.8 gms |
| | | | 533.4 |

The dry whole soybeans are rinsed and allowed to soak for 40 minutes. They are then placed in a pressure cooker and covered with water. Once a temperature of approximately 225° is reached, the soybeans are cooked at this approximate temperature for approximately 30 minutes. The beans are then removed from the heat and the water is drained and saved for addition later. 300 gms. of the cooked soybeans are ground or cut to a fine particle size and then mixed with 120 gms. of water which is 40% by weight of the ground, cooked soybeans. This process further reduces the particle size of the beans and creates the desired soy-paste. The soy-paste is then transferred to a suitable mixer and the other dry ingredients are added according to the percentages and weights indicated in Table I. The percentage of each of the dry ingredients is determined by the initial weight of the soy-paste which is the combination of cooked soybeans and the added water and not by the weight of just the cooked soybeans alone. Preferably, the isolate is added last. The final mixture is mixed into an homogeneous mass and stored under refrigeration until ready to use.

FORMULATION OF THE DESIRED END PRODUCT

The grinding and the mixing processes described hereinafter are critical for achieving the creation of the food product described herein. The soybeans must be comminuted to a very fine, pulverized condition to allow for complete intermixture and reaction with the whey solids. This is best accomplished by first cutting the cooked soybeans in a high speed food processor such as the commercial Hobart VCM or a home appliance such as the Sunbeam "Le Chef" food processor which I have used with its steel cutting and processing blade attachment. Since the soybeans are firm, this step will reduce the cooked soybeans to a powdery, granular size. At this point, water is added to slurry the soybean granules so they can be further processed into a paste-like consistency. The oil, lecithin and protein constituents of the soybeans are thereby liberated in the aqueous soy-paste to allow them to perform their functions with the whey solids and the non-fat dry milk and soy protein isolate if these two ingredients are used.

The mixing process is critical for obtaining the necessary reactions of the oil, lecithin and protein of the soybeans with the water, whey solids and lactose therein as well as with the soy protein isolate and skim milk solids when added thereto. As shown, the soybeans have been comminuted so the soybean constituents are released to react with the whey constituents and other ingredients, but it is the mixing process which guarantees that reactions between the several components takes place. The mixing is effected by using a high speed mixer with double whisk attachments. The whisks are made from type 302 spring tempered formed stainless steel wires operating in a planetary gear arrangement orbiting around a central gear shaft. They are similar to French whips well known to the food industry. The various ingredients are physically forced together by the compression created by the direct impact of the whisks against the various ingredients. Thorough homogenous mixing and the chemical reactions and bonding described beforehand are ensured by the rapid rotation of the whisks around the contoured stainless steel bowl as high speed forces are exerted on the various ingredients to cause their movement and force them to interreact as taught. The time necessary to accomplish this is from 1 to 4 minutes depending upon the fullness of the mixing container. It is preferable not to cover the mixing whisks more than half way, so impact and movement can be maximized.

As a mixing device useful to effect the contact necessary to ensure the inter-reaction of the constituents released from the cooked comminuted soybeans and those provided by the whey solids and other additives, I have successfully employed a Waring SUPERBOWL MIXER, Model No. 11 SM 11 having a mixing bowl providing a gross working capacity of about three quarts. The mixer included the two previously described wire whisks. To start the mixing, I usually set the speed of the rotor for the whisks initially at some 160 rpm, increasing the speed to 230 rpm and finally to 320 rpm at the end of the run, some 3 to 4 minutes when the bowl is about half full.

It is possible to determine when the ingredients are properly mixed and reacted by sight, because the entire character of the mixture changes once the ingredients have bonded together under the high speed mixing inherent in the mixing step. The soy-paste becomes smooth, light and fluffy, but firm and stable in body and texture. The fluffing effect is due in part to the tenderizing effect of the lactose and the properties of the soy and milk proteins. The milk protein, lactalbumin, found in whey and milk solids has excellent foaming properties which contribute to the lightness and fluffiness of the final product. However, the lactalbumin does not have the ability to stabilize and maintain the fluffiness of the product. The fluffiness remains after the vigorous mixing due to the stabilizing effects of the lecithin and the soybean proteins.

What is achieved by the physical and chemical combination of the several ingredients is far more than the mere aggregation of the functions and effects of the separate ingredients. The off-flavor and grittiness of the whey solids are masked by the soy-paste. The soy protein isolate and non-fat dry milk add body and texture to the mass while preserving smoothness, moistness and palatability. The above conditions occur due to the interactions of the oil, lecithin and protein from the comminuted soybeans with water, soy protein isolate and the lactose and proteins in whey and skim milk solids when subjected to the high speed mixing. Under these circumstances the several ingredients combine to create a homogeneous, highly nutritious, pleasingly moist and flavorful low cost food staple with a fluffy, light but firm and stable body and texture.

Taken together, the several ingredients, when combined as I have taught, provide a final product having properties which the several ingredients do not possess in their respective separate entities. The combination of substances results in a new effect, characteristic of a new and a different product which is not merely the sum of the separate effects of the separate ingredients.

I claim:

1. The process of preparing a high protein whey-soybean product comprising cooking previously uncooked dry soybeans until they are cooked to a firm texture, comminuting the cooked soybeans in finely ground form in the presence of sufficient water to form a soy paste without evidence of free water in which constituents of the cooked soybeans released upon comminution of the cooked soybeans are uniformly dispersed in comminuted form in the soy paste, mixing said soy paste with sufficient whey solids to inter-react the whey constituents with the released constituents in the soy paste and form a paste without evidence of free water of the intermixed and inter-reacted constituents of the soy paste and the whey solids.

2. A process as in claim 1 wherein water is present in an amount of from some 35 to about 120% by weight of the cooked soybeans and whey solids are present in an amount of from some 12% to about 63% by weight of the soy paste.

3. A process as in claim 2 wherein from 5% to 33% of non-fat dry milk by weight of the soy paste is inter-reacted with the soy paste and whey constituents.

4. A process as in claim 2 wherein from 3% to 18% of soy-protein isolate by weight of the soy paste is inter-reacted with the soy paste and whey constituents.

5. A process as in claim 2 wherein from 3% to 17% of non-fat dry milk and from 2% to 10% of soy-protein isolate by weight of the soy paste is inter-reacted with the soy paste and whey constituents.

6. A food product in the form of a paste without evidence of free water comprising dry soybeans cooked for the first time and comminuted in the presence of water sufficient to provide a soy-paste without evidence of free water containing constituents released from the soybeans upon their comminution and whey solids in sufficient amount uniformly dispersed in the soy-paste to inter-react the soybean constituents in the soy-paste with the whey constituents.

7. A food product as in claim 6 wherein the whey solids are present in an amount of from 12% to about 63% by weight of the soy-paste.

8. A food product as in claim 7 wherein from 5% to 33% of non-fat dry milk by weight of the soy-paste is uniformly dispersed in the soy-paste to inter-react the soy-paste and whey constituents with the constituents of the non-fat dry milk.

9. A food product as in claim 7 wherein from 3% to 18% of soy protein isolate by weight of the soy-paste is uniformly dispersed in the soy-paste to inter-react the soy-paste and whey constituents with the constituents of the soy protein isolate.

10. A food product as in claim 7 wherein from 3% to 17% of non-fat dry milk and 2% to 10% of soy protein isolate by weight of the soy-paste is uniformly dispersed in the soy-paste to inter-react the soy-paste and whey constituents with the constituents of the non-fat dry milk and the soy protein isolate.

* * * * *